US009369796B2

(12) United States Patent
Yagihashi et al.

(10) Patent No.: US 9,369,796 B2
(45) Date of Patent: Jun. 14, 2016

(54) ELECTRONIC DEVICE

(75) Inventors: Ayumu Yagihashi, Kanagawa (JP); Kenichi Kitatani, Kanagawa (JP); Hiroyuki Aoki, Kanagawa (JP); Yumi Katou, Kanagawa (JP); Atsuhiko Murayama, Kanagawa (JP); Seiji Sugahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 393 days.

(21) Appl. No.: 13/982,966

(22) PCT Filed: Feb. 1, 2012

(86) PCT No.: PCT/JP2012/000680
§ 371 (c)(1),
(2), (4) Date: Jul. 31, 2013

(87) PCT Pub. No.: WO2012/105253
PCT Pub. Date: Aug. 9, 2012

(65) Prior Publication Data
US 2013/0315034 A1 Nov. 28, 2013

(30) Foreign Application Priority Data
Feb. 1, 2011 (JP) .................................. 2011-020041

(51) Int. Cl.
*G01S 15/00* (2006.01)
*H04R 1/32* (2006.01)
(Continued)

(52) U.S. Cl.
CPC .......... *H04R 1/32* (2013.01); *H04N 21/42201* (2013.01); *H04N 21/439* (2013.01);
(Continued)

(58) Field of Classification Search
CPC ............................... H04S 7/302; G01S 15/025
USPC ....................................................... 367/95, 96
See application file for complete search history.

(56) References Cited

U.S. PATENT DOCUMENTS 5,758,173 A * 5/1998 Evoy ..................... G06F 1/1637
713/320
8,400,322 B2 * 3/2013 Acedo ....................... G06T 3/40
340/686.6
(Continued)

FOREIGN PATENT DOCUMENTS

CN 101312600 A 11/2008
JP 2001-025084 A 1/2001
(Continued)

OTHER PUBLICATIONS

Communication dated May 6, 2015 from the State Intellectual Property Office of People's Republic of China issued in corresponding application No. 201280007371.1.

*Primary Examiner* — Mark Hellner
(74) *Attorney, Agent, or Firm* — Sughrue Mion, PLLC

(57) ABSTRACT

There are provided an oscillation device that outputs a sound wave; a recognition unit that recognizes a direction in which sound output targets (80), for which a sound is to be output, are located; a selection unit that selects at least one of the sound output targets (80); a distance calculation unit that calculates a distance to the sound output target (80); and a control unit that controls the oscillation device to adjust sound pressure of the sound wave. The oscillation device outputs an ultrasonic wave for a sensor and a sound wave for sound reproduction. The distance calculation unit calculates a distance between the oscillation device and an object to be selected (82) by detecting the ultrasonic wave for a sensor reflected from the object to be selected (82) selected by the selection unit. The control unit adjusts the magnitude of the output of the sound wave for sound reproduction on the basis of the calculated distance between the oscillation device and the object to be selected (82).

10 Claims, 9 Drawing Sheets

(51) Int. Cl.
*H04R 1/40* (2006.01)
*H04N 21/422* (2011.01)
*H04N 21/439* (2011.01)
*H04N 21/442* (2011.01)
*H04N 5/60* (2006.01)
*H04R 17/00* (2006.01)

(52) U.S. Cl.
CPC ......... *H04N21/44218* (2013.01); *H04R 1/403* (2013.01); *H04N 5/60* (2013.01); *H04R 17/00* (2013.01); *H04R 2217/03* (2013.01); *H04R 2430/01* (2013.01); *H04R 2430/20* (2013.01)

(56) References Cited

U.S. PATENT DOCUMENTS

| | | | | |
|---|---|---|---|---|
| 2004/0160386 A1* | 8/2004 | Michelitsch | ............. | G09G 5/00 345/10 |
| 2006/0050892 A1* | 3/2006 | Song | ........................ | H04S 7/301 381/59 |
| 2008/0232608 A1* | 9/2008 | Ullmann | .................. | G01S 15/04 381/77 |
| 2008/0292115 A1* | 11/2008 | Ding | ........................ | H04S 7/302 381/104 |
| 2011/0193838 A1* | 8/2011 | Hsu | .......................... | G09G 5/00 345/207 |

FOREIGN PATENT DOCUMENTS

| | | |
|---|---|---|
| JP | 2002-345077 A | 11/2002 |
| JP | 2007-228385 A | 9/2007 |
| JP | 2008-047947 A | 2/2008 |
| JP | 2010-021705 A | 1/2010 |
| JP | 2010-039095 A | 2/2010 |
| JP | 2010-041167 A | 2/2010 |
| JP | 2010-239542 A | 10/2010 |

* cited by examiner

60

ELECTRONIC DEVICE

CROSS REFERENCE TO RELATED APPLICATIONS

This is a National Stage of International Application No. PCT/JP2012/000680, filed Feb. 1, 2012, claiming priority from Japanese Patent Application No. 2011-020041, filed Feb. 1, 2011, the contents of all of which are incorporated herein by reference in their entirety.

TECHNICAL FIELD

The present invention relates to an electronic device that uses ultrasonic waves.

BACKGROUND ART

Various techniques for speakers have been studied. For example, a technique using an oscillation device that oscillates ultrasonic waves may be mentioned. A highly directional sound field can be formed by using an oscillation device, which oscillates ultrasonic waves, for sound reproduction of a speaker. As a technique for a speaker using ultrasonic waves, for example, techniques disclosed in Patent Documents 1 to 4 may be mentioned. The technique disclosed in Patent Document 1 is to form an audible region, which can be moved arbitrarily, by controlling the frequency or phase of the oscillating ultrasonic wave.

The technique disclosed in Patent Document 2 controls the directivity by providing a plurality of speakers, which oscillate ultrasonic waves, inside the speaker cabinet and changing a sound signal to drive each speaker. The technique disclosed in Patent Document 3 is related to a super directional speaker including a unit that detects a target person for whom the sound is to be output. Patent Document 3 discloses that high advertising effect is obtained accordingly since the sound can be output with a person having a certain attribute as a target. The technique disclosed in Patent Document 4 is related to a directional speaker including a display unit that displays the output range of sound.

RELATED DOCUMENT

Patent Document

[Patent Document 1] Japanese Unexamined Patent Publication No. 2002-345077
[Patent Document 2] Japanese Unexamined Patent Publication No. 2001-25084
[Patent Document 3] Japanese Unexamined Patent Publication No. 2010-39095
[Patent Document 4] Japanese Unexamined Patent Publication No. 2010-21705

DISCLOSURE OF THE INVENTION

In sound reproduction using an electronic device, it is desirable to reproduce the sound with appropriate sound pressure for a target for which the sound is to be reproduced. However, the sound wave for reproducing the sound is attenuated while propagating through space. For this reason, it is necessary to adjust the magnitude of the output according to the distance from the target for which the sound is to be reproduced. In this case, a device for calculating the distance from the target for which the sound is to be reproduced and a device for outputting a sound wave are required. As a result, the electronic device becomes larger.

The present invention is intended to suppress an increase in the size of an electronic device capable of reproducing the sound with appropriate sound pressure for a target for which the sound is to be reproduced.

According to the present invention, there is provided an electronic device including: oscillation device that outputs a sound wave; a recognition unit that recognizes a direction in which sound output targets, for which a sound is to be output, are located; a selection unit that selects at least one of the sound output targets; a distance calculation unit that calculates a distance to the sound output target; and a control unit that controls the oscillation device to adjust sound pressure of the sound wave. The oscillation device outputs an ultrasonic wave for a sensor and a sound wave for sound reproduction. The distance calculation unit calculates a distance between the oscillation device and the selected sound output target by detecting the ultrasonic wave for a sensor reflected from the sound output target selected by the selection unit. The control unit adjusts magnitude of an output of the sound wave for sound reproduction on the basis of the calculated distance between the oscillation device and the selected sound output target.

According to the present invention, it is possible to suppress an increase in the size of an electronic device capable of reproducing the sound with appropriate sound pressure for a target for which the sound is to be reproduced.

BRIEF DESCRIPTION OF THE DRAWINGS

The above-described object and other objects, features, and advantages will become more apparent by preferred embodiments described below and the following accompanying drawings.

DESCRIPTION OF EMBODIMENTS

Figure 1:
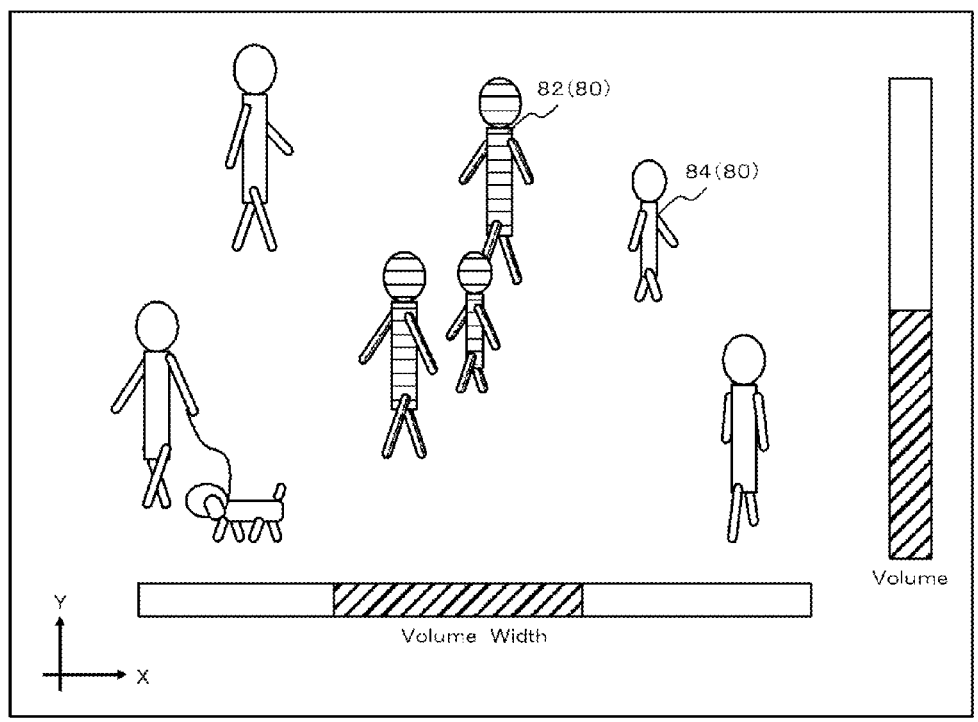
FIG. 1 is a schematic diagram showing an operation method of an electronic device according to a first embodiment.

Hereinafter, embodiments of the present invention will be described with reference to the drawings. In addition, the same components are denoted by the same reference numerals in all drawings, and explanation thereof will not be repeated.

FIG. 1 is a schematic diagram showing an operation method of an electronic device 100 according to a first embodiment. In addition, FIG. 2 is a block diagram showing the configuration of the electronic device 100 shown in FIG.

1. The electronic device 100 according to the present embodiment includes an oscillation device 10, a recognition unit 30, a selection unit 50, a distance calculation unit 20, and a control unit 40. For example, the electronic device 100 is a mobile terminal apparatus, such as a mobile phone.

The oscillation device 10 outputs an ultrasonic wave 92 for a sensor and a sound wave 90 for sound reproduction. The recognition unit 30 recognizes a direction in which a sound output target for which the sound is to be output (hereinafter, referred to as a sound output target 80) is located. The selection unit 50 selects at least one of the sound output targets 80. By detecting the ultrasonic wave 92 for a sensor reflected from the sound output target 80 selected by the selection unit 50 (hereinafter, referred to as an object to be selected 82), the distance calculation unit 20 calculates the distance between the oscillation device 10 and the object to be selected 82. The control unit 40 adjusts the magnitude of the output of the sound wave 90 for sound reproduction on the basis of the calculated distance between the oscillation device 10 and the object to be selected 82. Hereinafter, the configuration of the electronic device 100 will be described in detail with reference to FIGS. 1 to 5.

Figure 2:
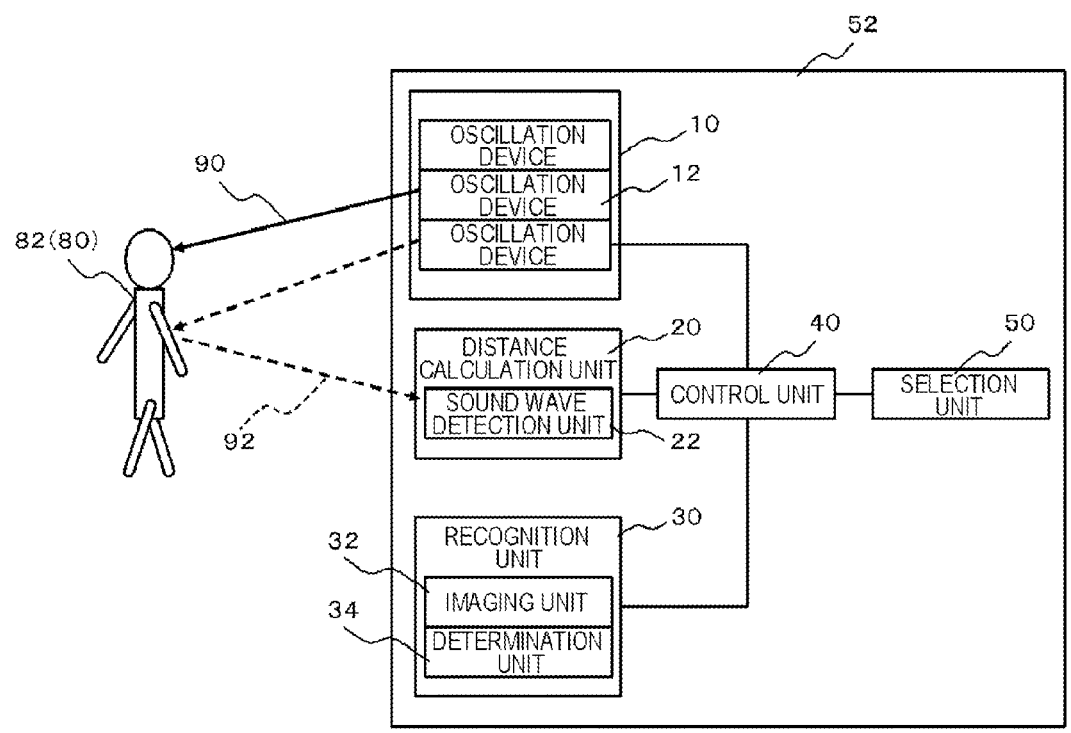
FIG. 2 is a block diagram showing the configuration of the electronic device shown in FIG. 1.

As shown in FIG. 2, the oscillation device 10 may be configured to include a plurality of oscillation devices 12. The plurality of oscillation devices 12 are configured so as to be separately controlled by the control unit 40, for example.

The recognition unit 30 includes an imaging unit 32 and a determination unit 34, for example. The imaging unit 32 generates image data by imaging a region including the sound output target 80. The determination unit 34 determines a direction, in which the sound output target 80 is located, by processing the image data. For example, the direction in which the sound output target 80 is located is determined by storing the feature amount of the possible sound output target 80, such as a person, in advance and matching this feature amount with image data. As examples of the feature amount, the size of the spacing of the eyes, the size and shape of a triangle connecting the eyes and the nose, and the like may be mentioned. In addition, the recognition unit 30 may have a function of determining the position of the sound output target 80 by automatically following the sound output target 80 when the sound output target 80 moves in the imaging region of the imaging unit 32.

The selection unit 50 transmits an instruction to the control unit 40 in response to the operation of an operation terminal, such as a display shown in FIG. 1, for example. For example, the selection unit 50 selects the object to be selected 82, sound pressure at the position of the object to be selected 82, and the like. According to the example shown in FIG. 1, the object to be selected 82 is selected by touching the display. Specifically, the object to be selected 82 can be selected by touching a portion in which the sound output target 80 is projected. In this case, as shown in FIG. 1, the object to be selected 82 and an object not to be selected 84 other than the object to be selected 82 can be displayed on the display so as to be able to be distinguished from each other, for example.

In addition, by operating and moving the bar located in a lower portion in FIG. 1, it is possible to select the object to be selected 82 by operating the output range. Specifically, the bar located in a lower portion in FIG. 1 is moved in the X-axis direction in FIG. 1. In this case, the sound output target 80 located in a region overlapping the bar, which is located in the lower portion in FIG. 1, in the Y-axis direction in FIG. 1 is selected.

In addition, it is also possible to select the sound volume by touching the bar located in a right portion in FIG. 1. Specifically, the level of the volume can be selected by operating the bar located in a right portion in FIG. 1 to move it in the Y-axis direction in FIG. 1.

The distance calculation unit 20 includes a sound wave detection unit 22, for example. The sound wave detection unit 22 detects the ultrasonic wave 92 for a sensor reflected from the object to be selected 82. The distance calculation unit 20 calculates the distance between the oscillation device 10 and the object to be selected 82 on the basis of the time until the ultrasonic wave 92 for a sensor is detected by the sound wave detection unit 22 after being oscillated by the oscillation device 10. In addition, when the electronic device 100 is a mobile phone, the sound wave detection unit 22 may be formed using a microphone, for example.

The control unit 40 is connected to the oscillation device 10, the distance calculation unit 20, the recognition unit 30, and the selection unit 50. In addition, the control unit 40 receives signals from the distance calculation unit 20, the recognition unit 30, and the selection unit 50, and controls the oscillation device 10.

The electronic device 100 further includes a housing 52. The housing 52 includes the oscillation device 10, the distance calculation unit 20, the recognition unit 30, the control unit 40, and the selection unit 50 thereinside. In addition, a hole through which the sound wave 90 for sound reproduction and the ultrasonic wave 92 for a sensor output from the oscillation device 10, and the reflected ultrasonic wave 92 for a sensor pass is provided in the housing 52.

Figure 3:
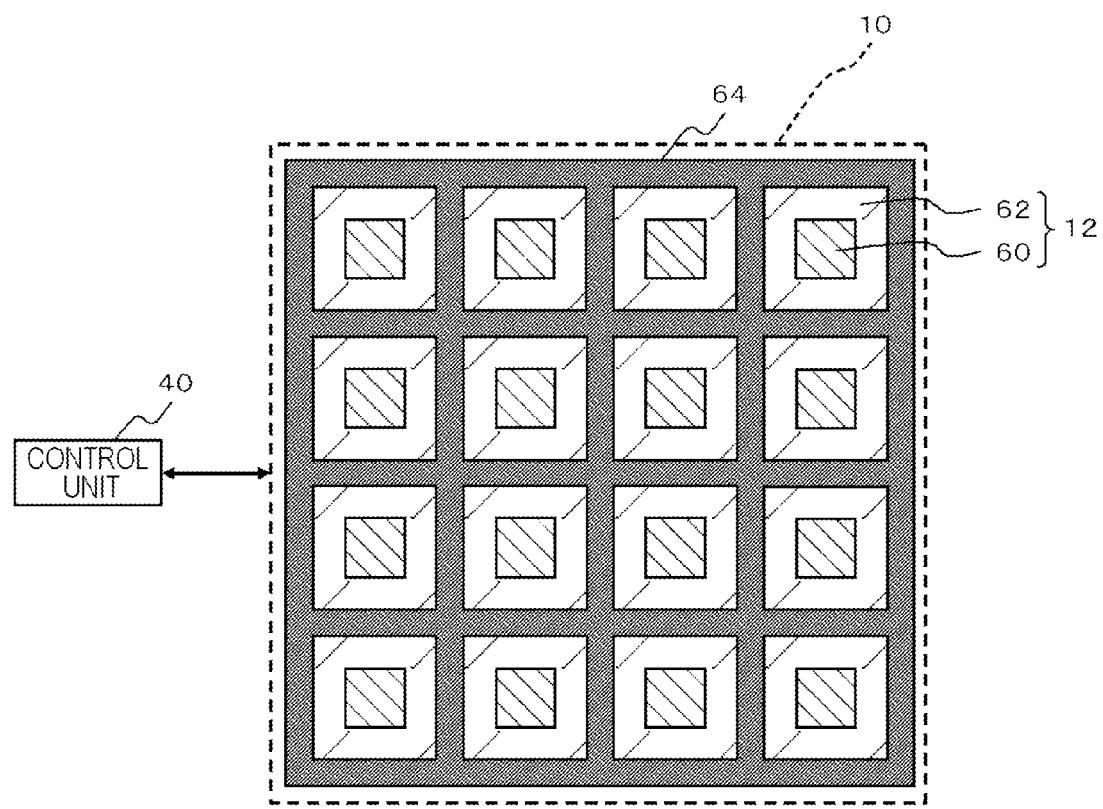
FIG. 3 is a plan view showing an oscillation device shown in FIG. 2.

FIG. 3 is a plan view showing the oscillation device 10 shown in FIG. 2. As shown in FIG. 3, the oscillation device 10 is formed by arranging a plurality of oscillation devices 12 in an array, for example. For example, the oscillation device 10 may be configured such that one oscillation device 12 outputs the sound wave 90 for sound reproduction and another oscillation device 12 outputs the ultrasonic wave 92 for a sensor, or may be configured such that one oscillation device 12 outputs the sound wave 90 for sound reproduction and the ultrasonic wave 92 for a sensor. The plurality of oscillation devices 12 are separately controlled by the control unit 40. In addition, one of the plurality of oscillation devices 12 may be configured to function as the sound wave detection unit 22.

Figure 4:
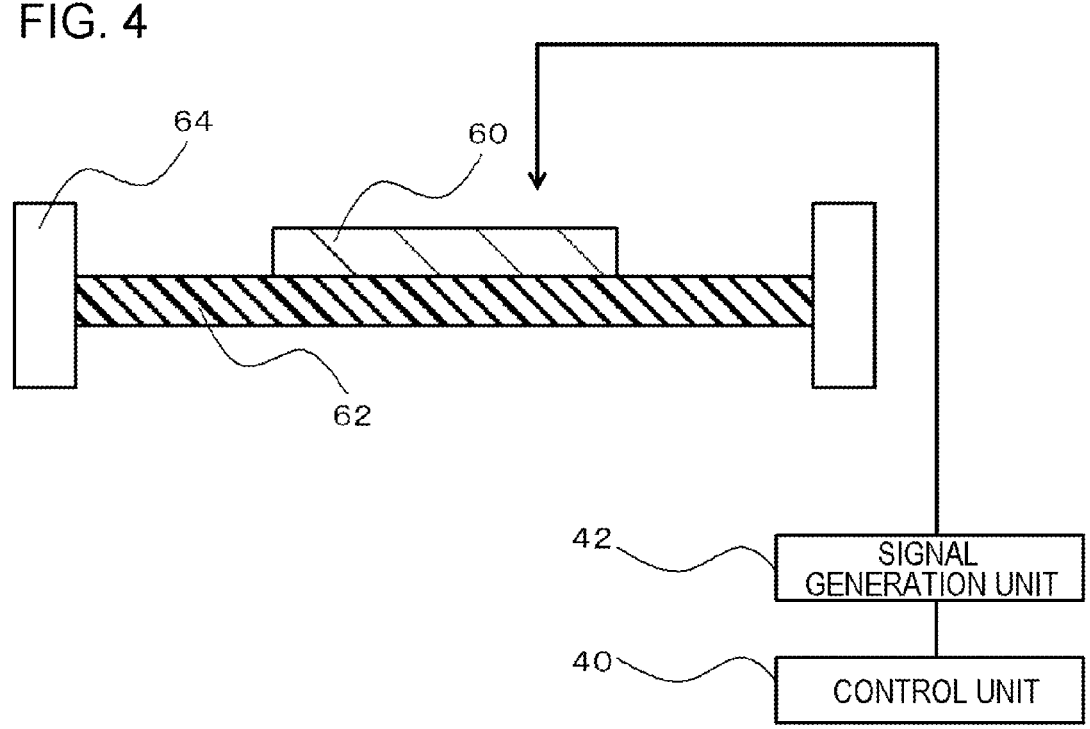
FIG. 4 is a cross-sectional view showing the oscillation device shown in FIG. 2.

FIG. 4 is a cross-sectional view showing the oscillation device 12 shown in FIG. 2. The oscillation device 12 includes a piezoelectric vibrator 60, a vibrating member 62, and a support member 64. The piezoelectric vibrator 60 is provided on one surface of the vibrating member 62. The support member 64 supports the edge of the vibrating member 62.

The control unit 40 is connected to the piezoelectric vibrator 60 through a signal generation unit 42. The signal generation unit 42 generates an electric signal input to the piezoelectric vibrator 60. The control unit 40 controls the signal generation unit 42 on the basis of the information input from the outside, thereby controlling the oscillation of the oscillation device 12. When the oscillation device 12 is used as a parametric speaker, the control unit 40 inputs, for example, a modulation signal as a parametric speaker through the signal generation unit 42. In this case, the piezoelectric vibrator 60 uses a sound wave of 20 kHz or higher, for example, sound wave of 100 kHz as a transport wave of a signal. The control unit 40 can control the oscillation device 12 so that the modulation wave of the parametric speaker oscillates and is directed toward only the object to be selected 82.

In addition, when the oscillation device 12 is used as a normal speaker, the control unit 40 may input the sound signal to the piezoelectric vibrator 60 as it is through the signal generation unit 42.

In addition, when the oscillation device 12 is used as a sound wave sensor, the signal input to the control unit 40 is a command signal indicating the oscillation of the sound wave. In addition, when the oscillation device 12 is used as a sound wave sensor, the signal generation unit 42 generates a sound wave of the resonance frequency of the piezoelectric vibrator 60 in the piezoelectric vibrator 60.

Figure 5:
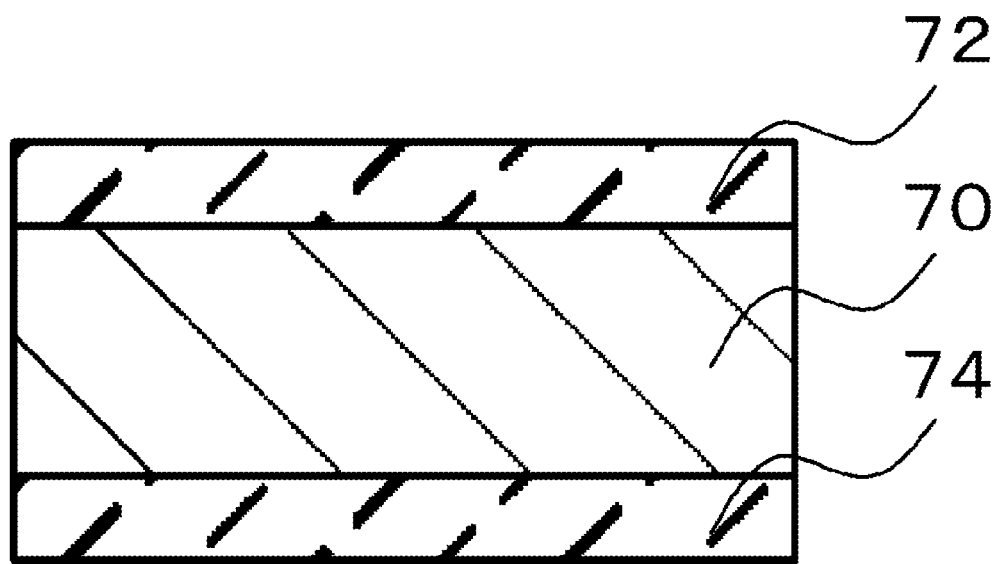
FIG. 5 is across-sectional view showing a piezoelectric vibrator shown in FIG. 3.

FIG. 5 is a cross-sectional view showing the piezoelectric vibrator 60 shown in FIG. 3. As shown in FIG. 5, the piezoelectric vibrator 60 is configured to include a piezoelectric body 70, an upper electrode 72, and a lower electrode 74. The piezoelectric vibrator 60 has a circular or elliptical shape, for example. The piezoelectric body 70 is interposed between the upper and lower electrodes 72 and 74. In addition, the piezoelectric body 70 is polarized in the thickness direction. The piezoelectric body 70 is formed of a material having a piezoelectric effect. For example, the piezoelectric body 70 is formed of lead zirconate titanate (PZT), barium titanate (BaTiO$_3$), or the like as a material having high electromechanical conversion efficiency. In addition, it is preferable that the thickness of the piezoelectric body 70 be 10 µm to 1 mm. Since the piezoelectric body 70 is formed of a brittle material, damage or the like is likely to occur at the time of handling in the case that the thickness is less than 10 µm. On the other hand, when the thickness exceeds 1 mm, the electric field strength of the piezoelectric body 70 is reduced. This causes a reduction in the energy conversion efficiency.

The upper and lower electrodes 72 and 74 are formed of a material having electrical conductivity. For example, the upper and lower electrodes 72 and 74 are formed of silver or silver/palladium alloy. Silver is a general-purpose low-resistance material, and is advantageous in terms of manufacturing cost or manufacturing process. In addition, silver/palladium alloy is a low-resistance material having excellent oxidation resistance, and is very reliable. It is preferable that the thickness of each of the upper and lower electrodes 72 and 74 be 1 µm to 50 µm. When the thickness is less than 1 µm, it is difficult to form the electrodes uniformly. On the other hand, when the thickness exceeds 50 µm, the upper electrode 72 or the lower electrode 74 becomes a restricting surface with respect to the piezoelectric body 70, resulting in a reduction in the energy conversion efficiency.

The vibrating member 62 is formed of a material having a high modulus of elasticity for the ceramic that is a brittle material, such as metal or resin. For example, the vibrating member 62 is formed of a general-purpose material, such as phosphor bronze or stainless steel. It is preferable that the thickness of the vibrating member 62 be 5 µm to 500 µm. In addition, it is preferable that the longitudinal elastic modulus of the vibrating member 62 be 1 GPa to 500 GPa. When the longitudinal elastic modulus of the vibrating member 62 is too low or too high, the characteristic or reliability as a mechanical vibrator may be adversely affected.

In the present embodiment, the sound reproduction is performed using the principle of operation of the parametric speaker. The principle of operation of the parametric speaker is as follows. The principle of operation of the parametric speaker is that sound reproduction is performed in the principle in which ultrasonic waves after AM modulation, DSB modulation, SSB modulation, or FM modulation are emitted into the air and the audible sound appears due to non-linear characteristics when the ultrasonic waves propagate in the air. The non-linear characteristics herein refer to that transition from laminar flow to turbulent flow occurs as the Reynolds number expressed by the ratio of the inertial effect and the viscosity effect of the flow increases. That is, since sound waves are finely disturbed in the fluid, the sound waves propagate in a non-linear shape. In particular, when the ultrasonic waves are emitted into the air, harmonics due to the non-linearity are noticeably generated. In addition, the sound waves are in a dense state in which molecular groups are densely mixed in the air and a sparse state in which molecular groups are sparsely mixed in the air. When it takes more time to restore air molecules than to compress them, the air that cannot be restored after compression collides with the air molecules propagating continuously to generate impact waves, and this generates an audible sound. Since the parametric speaker can form the sound field only around the user, it is excellent from the privacy protection perspective.

Figure 6:
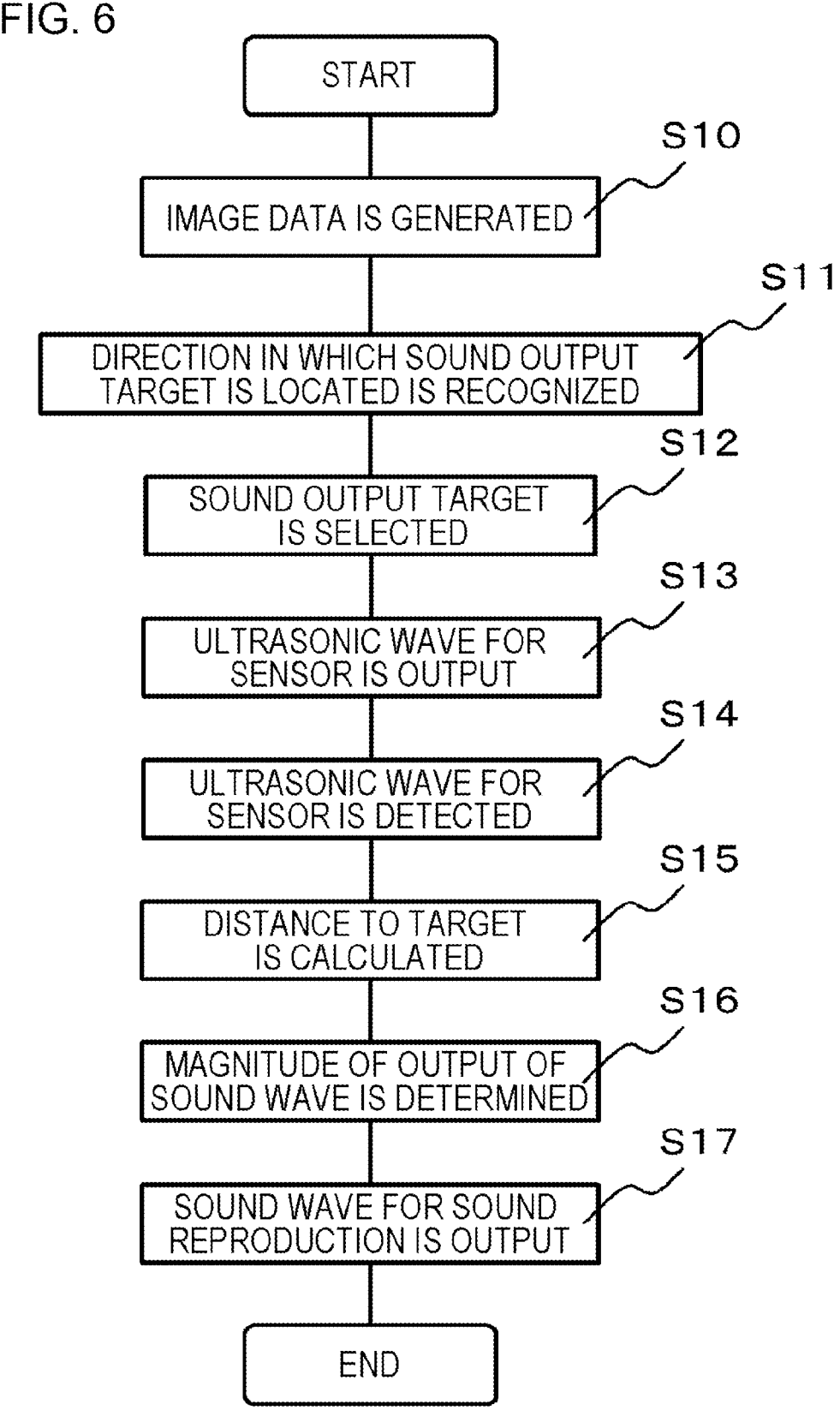
FIG. 6 is a flow chart showing the operation method of the electronic device shown in FIG. 1.
Figure 7:
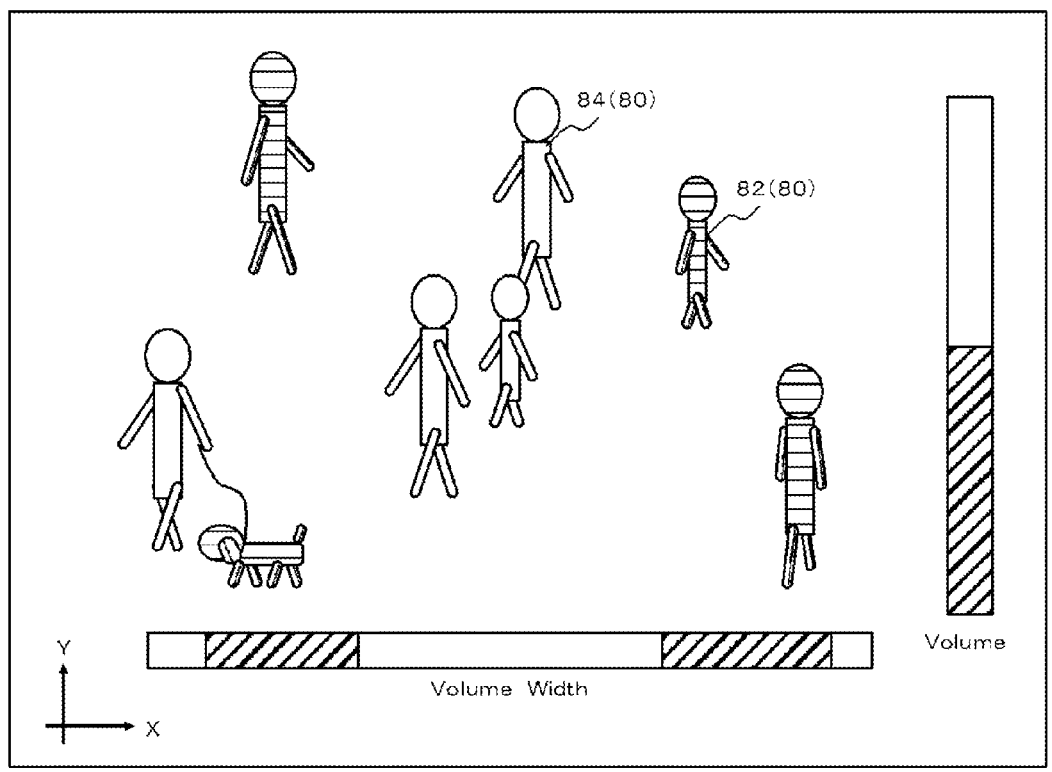
FIG. 7 is a schematic diagram showing the operation method of the electronic device shown in FIG. 1.

Next, an operation method of the electronic device 100 will be described. FIG. 6 is a flow chart showing the operation method of the electronic device 100 shown in FIG. 1. In addition, FIG. 7 is a schematic diagram showing the operation method of the electronic device 100 shown in FIG. 1. First, the imaging unit 32 generates image data by imaging a region including the sound output target 80 (S10). Then, the determination unit 34 determines a direction, in which the sound output target 80 is located, by processing the image data (S11). Accordingly, the direction in which the sound output target 80 is located is recognized.

Then, the user operates an operation terminal, and the selection unit 50 selects at least one of the sound output targets 80 according to the input according to this operation (S12). The object to be selected 82 may be a plurality of sound output targets 80 located in a fixed range as shown in FIG. 1. In addition, the objects to be selected 82 may be located in a plurality of ranges separated from each other as shown in FIG. 7.

Then, the control unit 40 controls the oscillation device 10 to output the ultrasonic wave 92 for a sensor to the object to be selected 82 (S13). Then, the sound wave detection unit 22 detects the ultrasonic wave 92 for a sensor reflected from the object to be selected 82 (S14). Then, the distance calculation unit 20 calculates the distance between the oscillation device 10 and the object to be selected 82 on the basis of the time until the ultrasonic wave 92 for a sensor is detected by the sound wave detection unit 22 after being oscillated by the oscillation device 10 (S15). Then, the magnitude of the output of the sound wave 90 for sound reproduction is determined on the basis of the distance between the oscillation device 10 and the object to be selected 82 (S16).

Then, the sound wave 90 for sound reproduction is output toward the object to be selected 82 (S17). In this case, the magnitude of the output of the sound wave 90 for sound reproduction is adjusted on the basis of the distance between the oscillation device 10 and the object to be selected 82. When the sound pressure at the position of the object to be selected 82 is selected by the selection unit 50, the control unit 40 adjusts the magnitude of the output of the sound wave 90 for sound reproduction so that the sound with the selected sound pressure is reproduced at the position of the object to be selected 82. When the plurality of objects to be selected 82 are selected, the adjustment of the magnitude of the output may be performed so that the sound pressure at the position of each of the plurality of objects to be selected 82 is fixed or the plurality of objects to be selected 82 have different sound pressure from each other, for example. In addition, the selection unit 50 may select the sound pressure at the position of the object to be selected 82 in response to the input according to the user's operation. When different sound pressure is set for the plurality of objects to be selected 82, the control unit 40 controls the oscillation device 10 so that the sound wave 90 for sound reproduction is directed toward each of the objects to be selected 82 and the magnitude of the output of the sound wave 90 for sound reproduction is adjusted for each object to be selected 82. When the recognition unit 30 follows and recognizes the position of the sound output target 80, the step (S15) of calculating the distance between the oscillation device 10 and the object to be selected 82 and the step (S16) of determining the magnitude of the output of the sound wave 90 for sound reproduction may be performed on the basis of the position of the sound output target recognized by the recognition unit 30 at any time.

The magnitude of the output of the sound wave 90 for sound reproduction is adjusted by controlling the amplitude of the sound wave 90 for sound reproduction, for example. In addition, when the sound wave 90 for sound reproduction is an ultrasonic wave, the magnitude of the output of the sound wave 90 for sound reproduction may be adjusted by controlling the directivity of the sound wave 90 for sound reproduction. That is, the directivity of the sound wave 90 for sound reproduction can be controlled by controlling the phase of each of the plurality of oscillation devices 12. When the directivity becomes narrow, the sound pressure becomes large since sound waves are focused in a narrow range. In this manner, the magnitude of the output of the sound wave 90 for sound reproduction is adjusted.

Next, the effects of the present embodiment will be described. According to the electronic device 100 according to the present embodiment, the distance to the object to be selected 82 is calculated by detecting the reflected ultrasonic wave 92 for a sensor. In addition, the magnitude of the output of the sound wave 90 for sound reproduction is adjusted on the basis of the distance between the oscillation device 10 and the object to be selected 82. Thus, it is possible to calculate the distance between the oscillation device 10 and the object to be selected 82 and output sound waves in an appropriate magnitude according to the calculated distance by using one oscillation device 10. Accordingly, it is possible to suppress an increase in the size of an electronic device capable of reproducing the sound with appropriate sound pressure for a target for which the sound is to be reproduced.

In addition, the electricity consumption of the electronic device can also be reduced by reproducing the sound with appropriate sound pressure for the selected sound output target.

In addition, the oscillation device oscillates a modulation wave of a parametric speaker. For this reason, when a plurality of sound output targets are selected, it is possible to adjust the output of a sound wave for each of the selected sound output targets. Therefore, since the sound with appropriate sound pressure can be reproduced for each of the selected sound output targets, it is possible to further reduce the electricity consumption of the electronic device.

Figure 8:
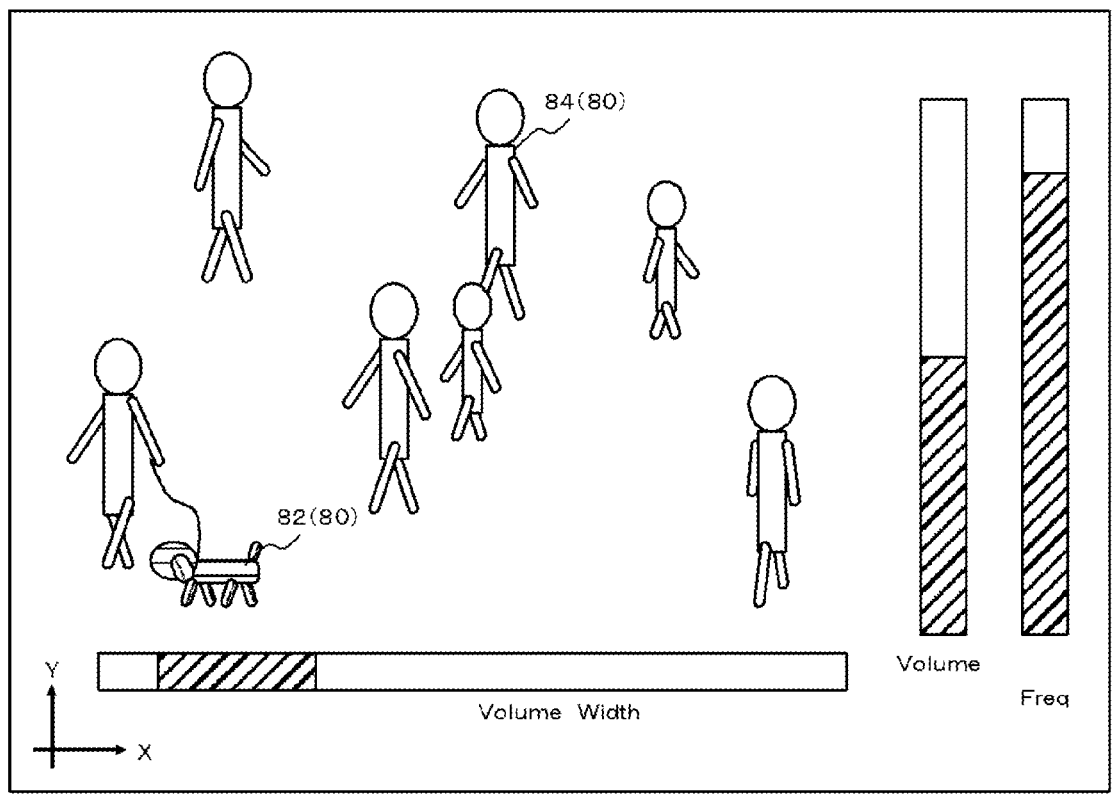
FIG. 8 is a schematic diagram showing an operation method of an electronic device according to a second embodiment.

FIG. 8 is a schematic diagram showing an operation method of an electronic device 100 according to a second embodiment, and corresponds to FIG. 1 in the first embodiment. The operation method of the electronic device 100 according to the present embodiment is the same as the operation method of the electronic device 100 according to the first embodiment except that the frequency of the sound wave 90 for sound reproduction is controlled.

In the present embodiment, the recognition unit 30 recognizes the attributes of the sound output target 80. For example, humans, animals, children, adults, the elderly, and the like may be mentioned as the attributes of the sound output target 80. For example, the attributes of the sound output target 80 are recognized by storing the feature amount of the possible sound output target 80 for each attribute in advance and matching this feature amount with image data. The control unit 40 matches the attributes of the sound output target 80 recognized by the recognition unit 30 with the frequency, which is stored in advance for each attribute, and controls the frequency of the sound wave 90 for sound reproduction on the basis of this matching result.

Figure 9:
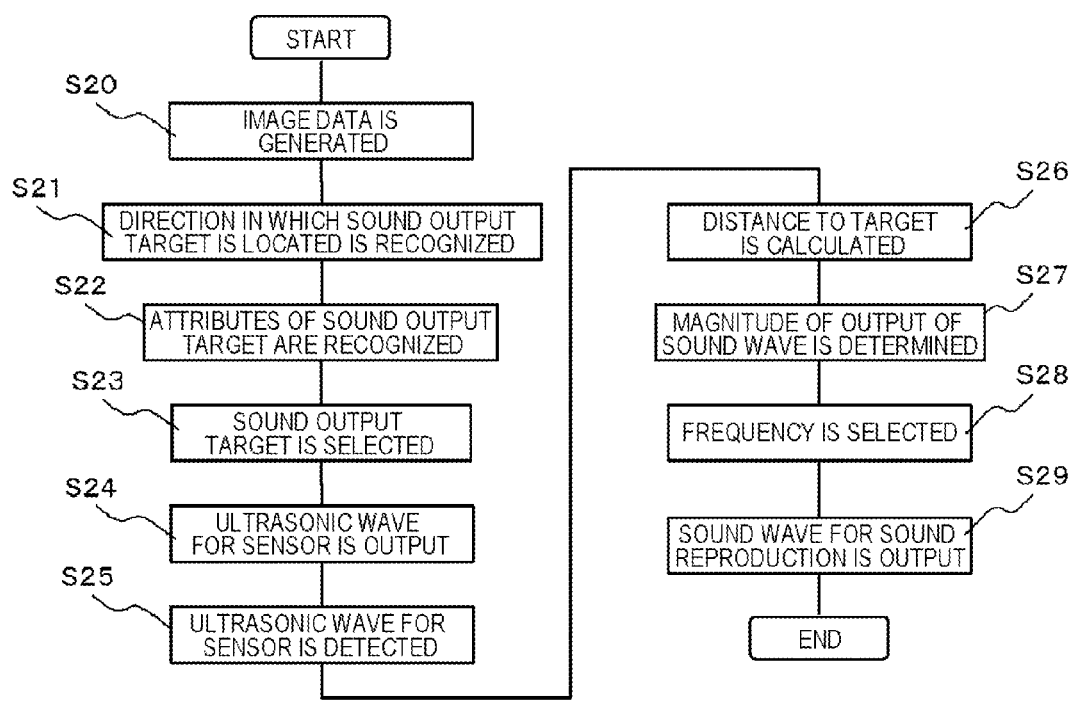
FIG. 9 is a flow chart showing the operation method of the electronic device shown in FIG. 8.

Next, an operation method of the electronic device 100 in the present embodiment will be described. FIG. 9 is a flow chart showing the operation method of the electronic device 100, and corresponds to FIG. 6 in the first embodiment. First, the imaging unit 32 generates image data (S20). Then, the determination unit 34 determines a direction in which the sound output target 80 is located. Accordingly, the direction in which the sound output target 80 is located is recognized (S21). These steps are the same as those in the first embodiment. The recognition unit 30 also recognizes the attributes of the sound output target 80 when recognizing the direction in which the sound output target 80 is located (S22).

Then, the selection unit 50 selects the object to be selected 82 (S23). Then, the control unit 40 controls the oscillation device 10 to output the ultrasonic wave 92 for a sensor to the object to be selected 82 (S24). The sound wave detection unit 22 detects the ultrasonic wave 92 for a sensor reflected from the object to be selected 82 (S25). Then, the distance calculation unit 20 calculates the distance between the oscillation device 10 and the object to be selected 82 (S26). The magnitude of the output of the sound wave 90 for sound reproduction is determined on the basis of the calculated distance between the oscillation device 10 and the object to be selected 82 (S27). These steps are also the same as those in the first embodiment.

Then, the frequency of the sound wave 90 for sound reproduction to be output to the object to be selected 82 is selected on the basis of the attributes of the object to be selected 82 recognized by the recognition unit 30 (S28). Then, the sound wave 90 for sound reproduction is output to the object to be selected 82 (S29). In this case, the magnitude of the output of the sound wave 90 for sound reproduction is adjusted in the same manner as in the first embodiment.

Also in the present embodiment, the same effects as in the first embodiment can be achieved. In addition, it is possible to output the sound wave 90 for sound reproduction having a frequency corresponding to the attribute of the object to be selected 82. Therefore, it is possible to provide a more convenient electronic device.

While the embodiments of the present invention have been described with reference to the drawings, these are only illustration of the present invention, and other various configurations may also be adopted.

This application claims priority from Japanese Patent Application No. 2011-020041, filed on Feb. 1, 2011, the entire contents of which are incorporated herein.

The invention claimed is:
1. An electronic device comprising:
an oscillation device that outputs a sound wave;
a recognition unit that recognizes a direction in which sound output targets, for which a sound is to be output, are located;
a selection unit that selects at least one of the sound output targets according to an operation of an operation terminal by a user;
a distance calculation unit that calculates a distance to the sound output target; and
a control unit that controls the oscillation device to adjust sound pressure of the sound wave,
wherein the oscillation device outputs an ultrasonic wave for a sensor and a sound wave for sound reproduction, the distance calculation unit calculates a distance between the oscillation device and the selected sound output target by detecting the ultrasonic wave for a sensor reflected from the sound output target selected by the selection unit, the control unit adjusts magnitude of an output of the sound wave for sound reproduction on the basis of the calculated distance between the oscillation device and the selected sound output target, and the recognition unit includes an imaging unit that generates an image data by imaging a region including the sound output targets and a determination unit that determines the direction, in which the sound output targets are located, by processing the image data.

2. The electronic device according to claim 1, wherein the distance calculation unit calculates the distance between the oscillation device and the selected sound output target on the basis of a time until the ultrasonic wave for a sensor is detected by the distance calculation unit after being oscillated by the oscillation device.

3. The electronic device according to claim 1, wherein the control unit controls the oscillation device so that a modulation wave of a parametric speaker oscillates and is directed toward only the selected sound output target.

4. The electronic device according to claim 3, wherein a plurality of the oscillation devices are provided, the selection unit selects a plurality of sound output targets, and the control unit controls the oscillation devices so that the sound wave is directed toward each of the plurality of selected sound output targets and the magnitude of the output of the sound wave is adjusted for each of the plurality of selected sound output target.

5. The electronic device according to claim 1, wherein the control unit adjusts sound pressure of a sound, which is to be reproduced for the selected sound output target, by controlling amplitude of the sound wave for sound reproduction.

6. The electronic device according to claim 1, wherein the control unit adjusts sound pressure of a sound, which is to be reproduced for the selected sound output target, by controlling directivity of the sound wave for sound reproduction.

7. The electronic device according to claim 1, wherein the selection unit selects sound pressure at a position of the selected sound output target, and the control unit adjusts the magnitude of the output of the sound wave for sound reproduction so that a sound with the selected sound pressure is reproduced at the position of the selected sound output target.

8. The electronic device according to claim 1, wherein the recognition unit recognizes attributes of the selected sound output target, and the control unit controls a frequency of the sound wave for sound reproduction, which is to be output for the selected sound output target, on the basis of the recognized attributes.

9. The electronic device according to claim 1, wherein the recognition unit follows and recognizes a position of the sound output target, and the calculation of the distance between the oscillation device and the selected sound output target by the distance calculation unit and the adjustment of the magnitude of the output of the sound wave for sound reproduction by the control unit are performed on the basis of a position of the sound output target recognized by the recognition unit at any time.

10. The electronic device according to claim 1, wherein the electronic device is a mobile communication terminal.

* * * * *